United States Patent [19]

Armbruster et al.

[11] Patent Number: 4,545,121
[45] Date of Patent: Oct. 8, 1985

[54] HAND-HELD POWER TOOL WITH CIRCULAR-DISK-SHAPED TOOL

[75] Inventors: Gerhard Armbruster, Stuttgart; Fritz Schädlich, Leinfelden-Echterdingen; Eberhard Seidel, Ostfildern, all of Fed. Rep. of Germany

[73] Assignee: Robert Bosch GmbH, Stuttgart, Fed. Rep. of Germany

[21] Appl. No.: 521,733

[22] Filed: Aug. 9, 1983

[30] Foreign Application Priority Data

Oct. 28, 1982 [DE] Fed. Rep. of Germany ....... 3239986

[51] Int. Cl.[4] .............................................. B27B 9/02
[52] U.S. Cl. ...................................... 30/374; 30/377; 51/170 PT; 83/875; 144/136 R
[58] Field of Search ................. 30/377, 289, 166, 374, 30/375, 391, 371; 83/875; 144/371, 136 R, 136 C; 51/170 R, 170 T, 170 PT; 82/83

[56] References Cited

U.S. PATENT DOCUMENTS

| 1,352,519 | 9/1920 | Laserson | 30/377 |
| 1,813,693 | 7/1931 | Balinski | 30/289 X |
| 2,702,565 | 2/1955 | Yelle | 144/136 C |
| 2,973,576 | 3/1961 | Hentke | 51/170 PT |
| 3,009,493 | 11/1961 | Dodegge | 144/136 R |
| 3,282,308 | 11/1966 | Sprague | 30/374 |

FOREIGN PATENT DOCUMENTS 887085 12/1981 U.S.S.R. .............................. 30/375

Primary Examiner—Jimmy C. Peters
Attorney, Agent, or Firm—Michael J. Striker

[57] ABSTRACT

A hand-held power tool with a circular-disk-shaped tool mounted on an output shaft which extends normal to a drive shaft has a guiding part which surrounds the tool in an immovable position at its cutting side. The guiding part has a wall arranged for abutting against a workpiece and having a through slot for the tool, and a guiding edge extending parallel to a cutting direction of the tool, and the guiding part being movably guided in direction normal to the wall.

11 Claims, 2 Drawing Figures

HAND-HELD POWER TOOL WITH CIRCULAR-DISK-SHAPED TOOL

BACKGROUND OF THE INVENTION

The present invention relates to a hand-held power tool. First of all, it relates to a so-called angle grinder (angle sander).

These power tools are used with free hands. The power tool produces a straight cut over a long cutting length only with great difficulty and after preliminary marking of the cutting line. A predetermined cutting depth practically cannot be obtained. Known hand-held circular saws in which the output shaft supporting the saw blade runs parallel to the shaft of the drive motor are poorly suited for various tasks, for example for sawing shade grooves for wooden floors. The required cut can be produced neither sufficiently close to the neighboring wall, nor to the last board of the floor covering. In the utilized hand-held circular saws, the protection at the cutting side of the saw blade is arranged rotatable in its working position and held there when not in use. For permitting penetration of the saw blade into the workpiece, the protection end must abut on the workpiece, and the hand-held circular saw is guided along the predetermined cutting path for such a time until the protection is turned to its releasing position. The distance required therefor cannot be sawn. Moreover, the handling of the known hand-held circular saws for this operation is difficult and exhausting.

SUMMARY OF THE INVENTION

Accordingly, it is an object of the present invention to provide a hand-held power tool which avoids the disadvantages of the prior art.

More particularly, it is an object of the present invention to provide a hand-held power tool which has an easier handling and a more reliable cutting guidance close to a limiting surface, as compared with known hand-held power tools.

In keeping with these objects and with others which will become apparent hereinafter, one feature of the present invention resides, briefly stated, in a hand-held power tool comprising a drive shaft, an output shaft extending angularly to said drive shaft, a circular-disk-shaped tool mounted on said output shaft, wherein a guiding part surrounds in an immovable position the tool at its cutting side and has a wall arranged for abutting against a workpieced with a through slot for the tool, and a guiding edge extending parallel to a cutting direction of the tool, the guiding part being movably guided in a direction normal to the wall.

When the hand-held tool is designed in accordance with the present invention, it provides for the above mentioned advantages. Because of the provision of a guiding part which allows an unobjectionable insertion cut, a parallel cut to a guiding surface, a cutting depth and a protection for the operator in the event of lifted held-hand power tool are guaranteed.

It is especially advantageous when a protective housing and a guiding part form together an auxiliary unit for mounting on a clamping collar of an angular grinder.

The novel features which are considered characteristic for the invention are set forth in particular in the appended claims. The invention itself, however, both as to its structure and its method of operation, together with additional objects and advantages thereof, will be best understood from the following description of specific embodiments when read in conjunction with the accompanying drawing.

DESCRIPTION OF THE PREFERRED EMBODIMENTS

Figure 1:
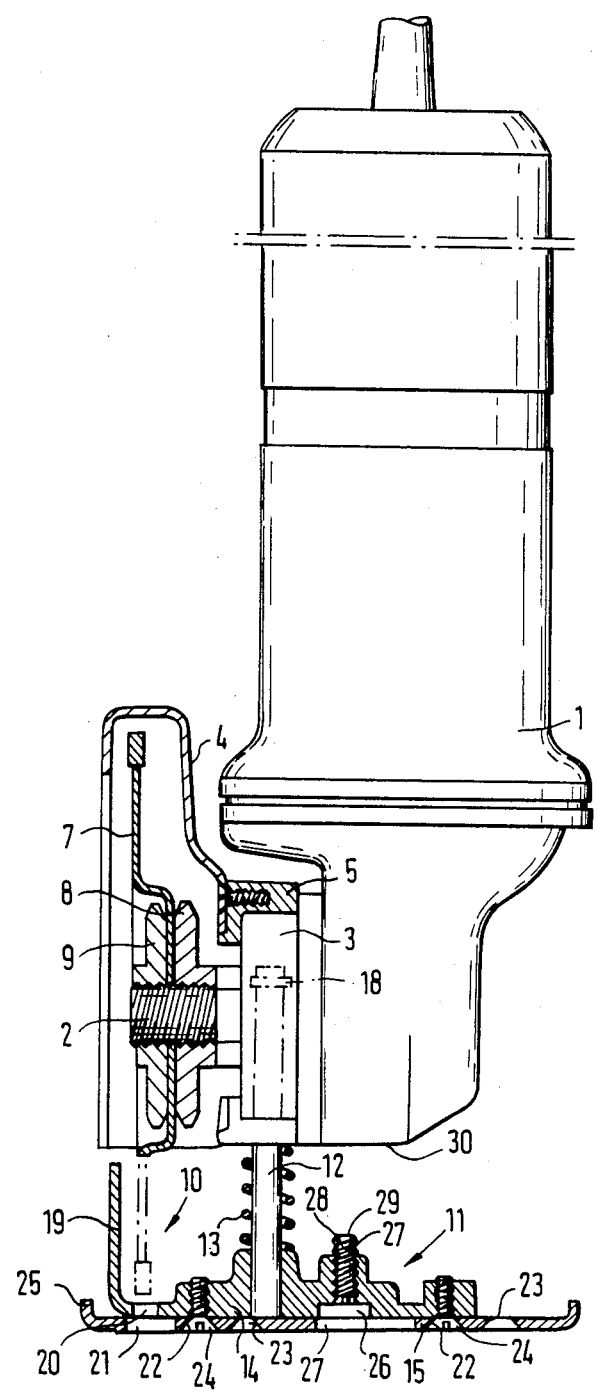
FIG. 1 is a view showing a hand-held power tool in accordance with the present invention.

An angular grinder 1 is identified with reference numeral 1 and has a motor arranged in its longitudinal direction and an angular transmission which ends in an output shaft 2. A protective housing 4 is mounted on a clamping collar 3 of the angular grinder 1.

The protective housing 4 is provided for this purpose with a connecting socket 5 which is slit and can be fixedly clamped by a clamping screw 6 on the clamping collar 3. A circular saw blade 7 is clamped on the output shaft 2 instead of a grinding disk. The circular saw blade 7 which is used in the shown example has a cup-shape and is fixedly clamped with two nuts 8 and 9. The protective housing 4 surrounds the circular saw blade 7 in the region which is not provided for the sawing cut. A cutting region 10 of the saw blade 7 is protectively surrounded by a guiding part 11 when the tool is not in use.

Two guiding pins 12 are mounted with their one end in the guiding part 11. A helical pressure spring 13 is arranged on each guiding pin 12. The guiding pins 12 extend outwardly beyond the guiding part 11 and normal to a wall 14 which is provided for lying directly or via an additional foot plate 15 on a surface of the workpiece. The free ends of the guiding pins 12 extend through guiding openings 16 in tongues 17 of the protective housing 4.

Figure 2:
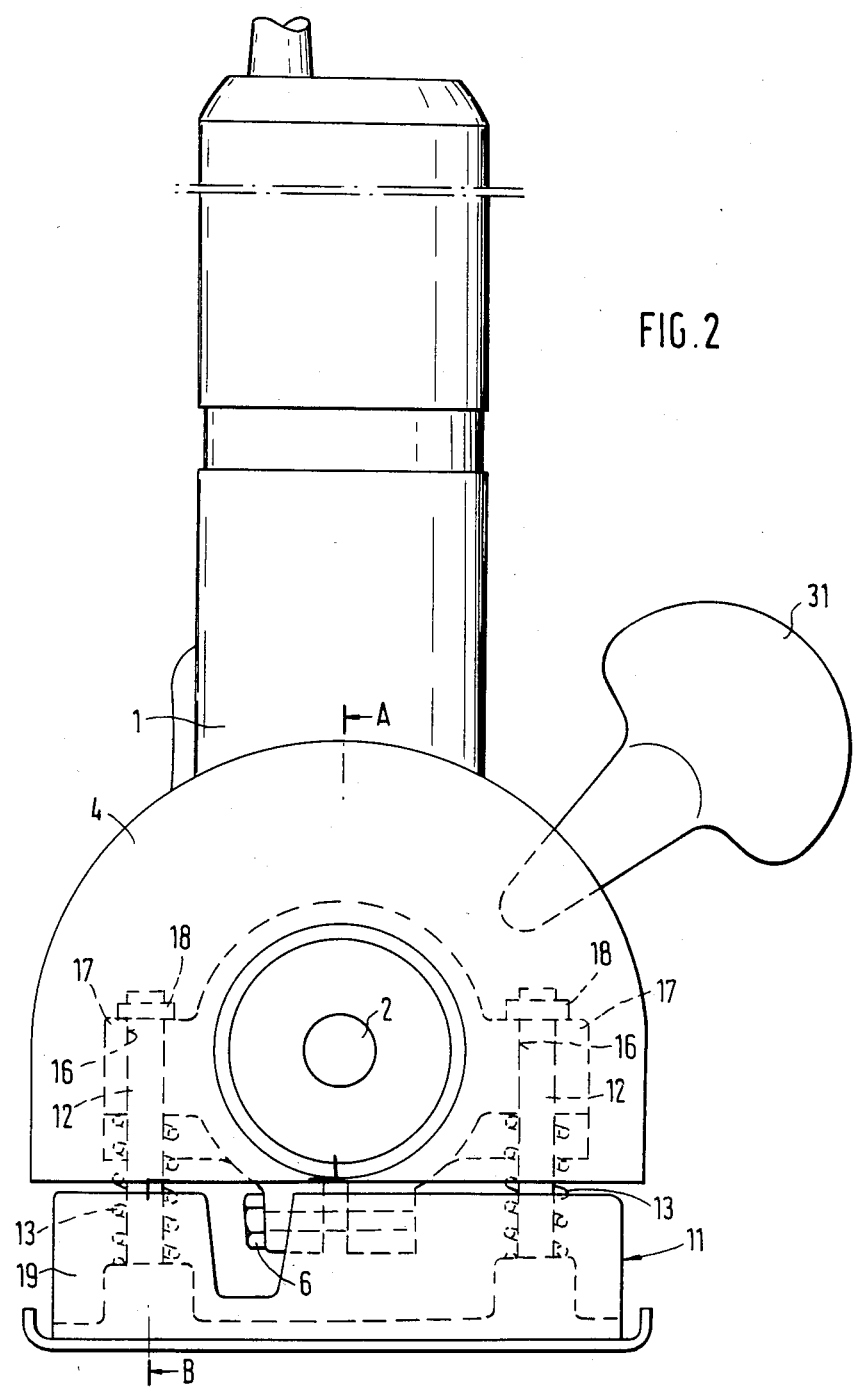
FIG. 2 is a side view of the hand-held power tool of FIG. 1.

Safety disks 18 secure the guiding pins 12 against sliding out of the guiding openings 16 under the action of the helical pressure springs 13. Simultaneously the safety disks 18 determine the distance of the guiding part 11 from the protective housing 4. In the immovable position of the guiding part 11 shown in FIGS. 1 and 2, the guiding part 11 surrounds the cutting region 10 by the wall 14 and a lateral wall 19 which angles normal to the wall 14. The wall 14 determines a through slot 20 for the circular saw blade 7. A cut-out 21 in the foot plate 15 is wider than the through slot 20, since it must permit the passage of the circular saw blade 7 in various relative positions of the foot plate 15 to the wall 14.

The foot plate 15 has at least two groups 22 and 23 of through bores with sinking through which countersunk screws 24 can be screwed into the wall 14. Thereby the foot plate 15 is mounted on the wall 14. In dependence upon which group of the through bores 22 or 23 is used for mounting of the foot plate 15 on the wall 14, the distance of an abutment edge 25 of the foot plate 15 from the circular saw blade 7 changes. A recess 26 in the wall 14 and a cut-out 27 in the foot plate 15 make accessible a threaded opening 27' in the wall 14 from the foot plate 15. A threaded pin 28 is screwed into this threaded opening 27'. Depending upon its screwing-in position, the distance between its end surface 29 extending through the wall 14 and an abutment surface 30 of the housing of the angular grinder 1 is determined. This distance determines the possible insertion path of the circular saw blade 7 into the workpiece after passage of the circular saw blade 7 through the slot 20 and the cut-out 21. The cutting depth of the circular saw blade 7 is thereby adjustable. An additional handle 31 is mounted in the shown example on the protective housing 4. The normal handle forms the elongated housing of the angular grinder 1.

For working with the inventive hand-held power tool, the foot plate 15 is connected with the wall 14 in a position to the wall 14 which forms a distance between the abutment edge 25 and the circular saw blade 7, to provide a desired width of the shade groove. After this, the foot plate 15 is set on the lined ceiling so that the abutment edge 25 abuts completely on a neighboring wall. The housing of the angular grinder 1 ends then normal to the ceiling and is easy to manipulate. The handle 31 improves the access. The hand-held power tool can therefore be reliably guided. For sawing, the angular grinder 1 is pressed onto the ceiling against the force of the helical pressure springs 13. The circular saw blade 7 penetrates through the through slot 20 and the cut-outs 21 into the workpiece ceiling. By the threaded pins 28 the insertion depth is dimensioned such that the lining layer is exactly well cut. After reaching the abutment position of the abutment surface 30 on the end surface 29 of the threaded pin 28, the hand-held power tool is moved along the room wall until the shade groove cut is finished. During lifting of the angular grinder 1, the guiding part 11 returns back under the action of the helical pressure spring 13 into its immovable position shown in FIGS. 1 and 2 and protects the operator from contact with the rotating circular saw blade 7. The position of the lateral wall 19 is dimensioned such that during penetration of the circular saw blade 7 into the workpiece it dips into the interior of the protective housing 4. The beginning and the end of this shade groove cut is determined by the distance of the outer surface of the protective housing 4 from the rotary axis of the output shaft 2 and the radius of the circular saw blade 7. When such a hand-held power tool in accordance with the present invention is utilized, it is only necessary to adjust the first and the last layer of the ceiling coating by hand.

It will be understood that each of the elements described above, or two or more together, may also find a useful application in other types of constructions differing from the types described above.

While the invention has been illustrated and described as embodied in a hand-held power tool with a circular-disk-shaped tool, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A hand-held power tool, comprising a drive shaft; an output shaft extending angularly to said drive shaft; a circular-disk-shaped cutting tool element mounted on said output shaft and having an axis; and a guiding part surrounding said tool element in its immovable position at its cutting side, said guiding part having a wall arranged for abutting against a workpiece and having a through slot for said tool element, and a guiding edge which is formed as a further wall extending parallel to a cutting plane of said tool element and upwardly beyond said first-mentioned wall in direction away from a workpiece, said guiding part being movable guided in a direction normal to said wall and normal to said axis of said tool element.

2. A hand-held power tool as defined in claim 1, wherein the hand-held power tool is an angular power tool, said circular-disk-shaped tool element being formed as a circular saw blade mounted on said output shaft.

3. A hand-held power tool as defined in claim 2, wherein said circular saw blade has a part facing away from the workpiece; and further comprising a protective housing which surrounds said part of said circular saw blade, and means for connecting said guiding part with said protective housing.

4. A hand-held power tool as defined in claim 3, wherein said connecting means includes two guiding openings provided in said protective housing, two guiding pins mounted with their one ends in said guiding part, two pressure springs received by said guiding pins between said guiding part and said protective housing, and securing members arranged on said guiding pins at their ends extending outwardly beyond said guiding openings for securing said guiding pins against withdrawl from said guiding openings.

5. A hand-held power tool as defined in claim 2, wherein said guiding part and said protective housing form two elements; and further comprising a power tool housing having an abutment surface, and an adjustable abutment provided in one of said elements and directed towards said abutment surface, so as to adjust said guiding part and therefore an insertion depth of said circular saw blade into the workpiece.

6. A hand-held power tool as defined in claim 1, wherein said guiding part has at least lateral wall extending parallel to a guiding direction of said guiding part.

7. A hand-held power tool as defined in claim 2, wherein said guiding part has a foot plate which is provided with at least one abutment edge extending parallel to said circular saw blade and having an adjustable distance from said circular saw blade.

8. A hand-held power tool as defined in claim 1, wherein said protective housing has an auxiliary handle.

9. A hand-held power tool as defined in claim 2, wherein said protective housing forms together with said guiding part an auxiliary unit for clamping on the angular grinder.

10. A hand-held power tool as defined in claim 9, wherein the angular grinder has a clamping collar; said auxiliary unit formed by said protective housing and said guiding part being mountable on said clamping collar of the angular grinder.

11. A hand-held power tool, comprising a drive shaft; an output shaft extending angularly to said drive shaft; circular-disk-shaped cutting tool element mounted on said output shaft and having a part facing away from a workpiece; a protective housing which surrounds said part of said circular-disk-shaped tool element; and a guiding part surrounding in an immovable position said tool element at its cutting side, said guiding part having a wall arranged for abutting against a workpiece and having a through slot for said tool element, and a guiding edge extending parallel to a cutting direction of said tool element, said guiding part being movable guided in a direction normal to said wall, said guiding part having at least one lateral wall extending parallel to a guiding direction of said guiding part and arranged so that during penetration of the circular disc-shaped tool element into the workpiece it is inserted into the interior of said protective housing together with said circular disc-shaped tool element.

* * * * *